Patented Jan. 15, 1946

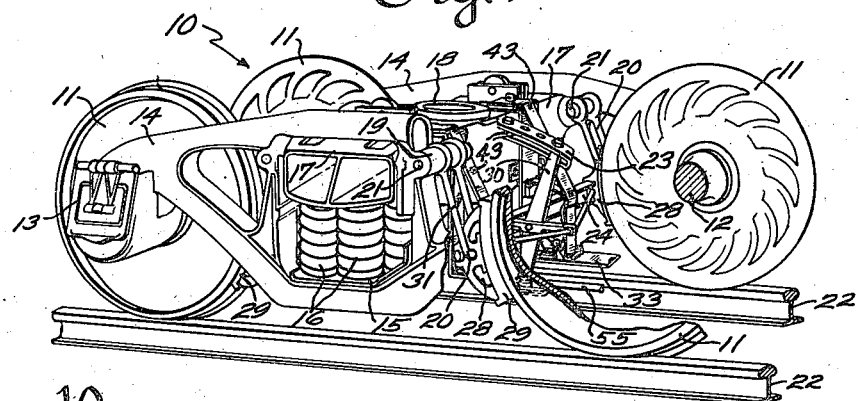

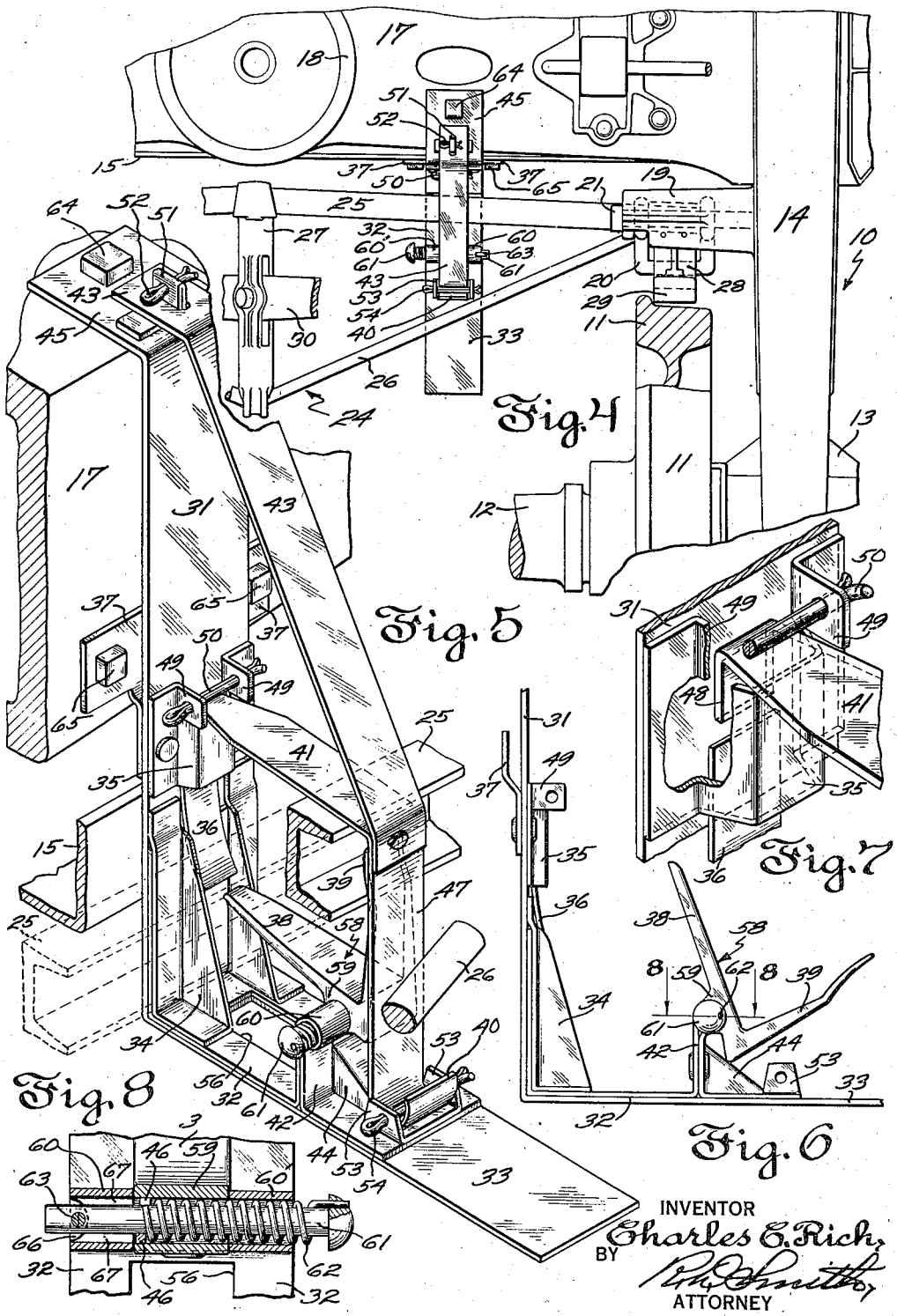

2,393,121

UNITED STATES PATENT OFFICE 2,393,121

SAFETY TRAP FOR DISABLED BRAKE GEAR

Charles C. Rich, Bridgeport, Conn.

Application May 16, 1944, Serial No. 535,775

20 Claims. (Cl. 188—210)

This invention relates to emergency supports for brake beams on railway car trucks, the same being safety devices which automatically come into play when brake gear has been so disabled as to result in "down brake beams," a common cause of car derailments.

Possibilities of train wreck or other serious damage to train men, passengers, and rolling stock are always present in disabled brake gear, particularly in the case of fallen brake beams which may either drop on the track and ride under the wheels, thus derailing a car, or ride upward over the wheel to cause further damage or breakage to the running gear of the car. Falling of such beams may result from several causes, an instance being excess wear or shearing off of pivot pins on which the beam hangers are swingably supported from the car truck. Also the shoe carrying brake head may part from the brake beam permitting the latter to drop. So great is the potential threat to life and property from disabled brake gear that safety authorities subscribed to by leading railroads are insisting on better and more dependable preventatives of disaster from such causes than heretofore have been employed in practical railroading.

Initial dropping of one end of a brake beam may not in itself immediately throw brake gear against the car wheels but may later produce this result upon application of braking force to the disabled beam in a direction toward the wheels, usually by air pressure actuated linkage.

Accordingly a prime object of this invention is automatically to entrap or hold brake gear safely clear of the wheels and track, both when the gear is initially disabled and when the gear is subjected to brake-applying force to stop a train.

A contributory object is to prevent a disabled brake from being thrust against a car wheel when one or both ends of its brake beam have fallen below normal service position.

A related object is to prevent the shoe or shoes of a fallen brake beam from being forced against a wheel in a manner to be caused to ride upward therewith and cause further damage to the brake gear.

A further object is to cause the friction drag exerted by a turning wheel on a disabled brake shoe, when the brake is applied, to cause the brake beam of such shoe to become positively locked against displacement responsive to said drag of the wheel.

A further object is to provide a unitary device that may be built onto an otherwise conventional car truck, or if preferred detachably mounted on various such car trucks, in a manner automatically to perform the aforesaid safety functions particularly with respect to brake beams which themselves are of ordinary or conventional construction.

Another object is so to construct such a unitary device that a fallen brake beam entrapped thereon may quickly be removed without dismounting the device as a whole from the car truck.

A still further object is to provide a safety trap of such low cost and simple sturdy construction that one such trap may be applied to each end portion of each brake beam on the car so that a train of cars so equipped shall be insured dependably against wrecks from disabled brake gear.

The foregoing and other objects of the invention will appear in greater particular in the following description having reference to the accompanying drawings, wherein:

Fig. 1 is a perspective view of a typical four-wheel railway car truck and sections of track rails on which it rides, the near wheel being broken away to expose brake beam safety traps embodying the present invention.

Fig. 2 is a sectional view on a larger scale looking sidewise at the far safety trap of Fig. 1 from between the rails.

Fig. 3 is a fragmentary view similar to Fig. 2 showing a fallen brake beam imprisoned in the trap.

Fig. 4 is a plan view on a reduced scale looking downward on Fig. 2.

Fig. 5 is an isometric view of one complete beam trap showing fragments of the truck by which it is supported and of the brake beam which it safeguards against train wrecking displacement.

Fig. 6 is a view similar to Fig. 2 drawn on the same scale as Figs. 2 and 4 showing the frame yoke removed.

Fig. 7 is a fragmentary cut-away view showing a tongue and socket anchorage for the frame yoke.

Fig. 8 is an enlarged fragmentary plan view taken in section on the plane 8—8 in Fig. 6.

Fig. 9 is a fragmentary cut-away perspective view showing a feature of the hinge spring construction of Fig. 8.

Fig. 10 is a view looking from the left at the end of the hinge pin in Fig. 8.

In Fig. 1 the conventional truck of a railway car is designated 10. Its conventional parts include the wheels 11 joined in pairs by axles 12 whose outer ends are journaled in bearing boxes 13 that are rigid with the sides 14 of the truck. Truck sides 14 are bridged transversely as usual by a spring plank 15 supporting springs 16 on which rides the bolster 17 provided centrally with an upward facing annular bearing boss 18 serving as pivotal support for the car body (not shown). As the present invention concerns more particularly the truck carried brake gear, portions of the truck not directly concerned therewith need not be illustrated nor described in greater detail.

The truck sides 14 have the usual inwardly directed bosses 19 from which are pivotally suspended brake hangers 20 freely swingable on pivot studs 21 fixed in bosses 19. The rest of the brake gear may include any conventional form of brake beam, herein designated as a whole by 24, and consisting usually of a rigid trussed structure including a compression or channel member 25, a tension rod member 26, a trussing strut 27, and the brake heads 28 carrying the brake shoes 29. Opposite ends of the brake beam are swingably supported by the aforesaid hangers 20 while the middle of a brake actuating lever 30 is pivotally connected to strut 27 and pivotally hangs from truck anchorage 23 to be pulled toward the right in Fig. 1 by draft rod 55 having connections to an air brake cylinder (not shown).

In a typical form of my improved brake beam safety trap as herein illustrated the trap frame proper includes a rigid skeleton L-shaped bracket structure underlying the brake beam and having a vertical section or mounting bar 31 ending in a backward projecting suspension head 45 adapted to be supported on and removably secured to the top of bolster 17 by bolts 64 threading into the bolster. A fastening strap 37 rigid with mounting bar 31 is secured to the side of bolster 17 by bolts 65 threading into the bolster and thereby serves as additional holding support for the trap frame. The L-shaped frame further includes a horizontal section or shelf iron 32 rigid with mounting bar 31 and carried somewhat higher than the track rails 22 yet spaced a suitable distance below brake beam 24. Shelf iron 32 extends forwardly at 33 to underlie the tension rod 26 of the brake beam. Sturdiness of the trap frame is further increased by fillet wings 34 welded or otherwise firmly united both to back bar 31 and to shelf iron 32 at their corner junction at the bend of the L-shaped frame.

On shelf iron 32 there is anchored by cotter pin 54 between channel member 25 and tension rod 26 the bottom hooked end 40 of the riser 47 of a skeleton frame yoke that is omitted in Fig. 6. Cotter pin 54 is removably lodged in two ears 53 rigid with shelf iron 32. The yoke includes in rigid relation to riser 47 a horizontal span 41 and a slanting suspension brace 43. Yoke span 41 extends from riser 47 to the mounting bar 31 where its turned-down end forms a tongue 48 that tucks down into the retaining socket 35, which may be formed by sheet metal bent to provide the ears 49 above and at the sides of socket 35. Ears 49 contain axially aligned holes to receive a removable cotter pin 50 which prevents tongue 48 from rising out of socket 35. The slanting brace 43 is fixed both to riser 47 and to yoke span 41 at the common junction point thereof and its top end overlaps the head 45 of mounting bar 31. This top end of the brace contains a slot that fits removably over an upstanding fin or keeper 51 fixed on head 45 and having a transverse hole to receive the removable cotter pin 52 which holds strap 43 in engagement with keeper 51 whereby the former serves as a suspension brace and shares the supporting function of mounting bar 31.

By the removal of cotter pins 50, 52, and 54, the entire frame yoke 41, 43, 47 can be taken off as a unit from the L-shaped frame 31, 32.

There is a hinge bracket 42 fixedly mounted on shelf iron 32 which is made strong and rigid relative thereto by a triangular corner brace 44. The beam receiving space between bracket 42 and the frame wings 34 delineates a downward tapering pocket above which the beam member 25 rides in normal service position. At the bottom of this pocket between bracket 42 and mounting bar 31, shelf iron 32 contains an alongated aperture 56. Pivotally mounted on bracket 42 there is a swingable two-armed gate or bell crank 58 composed of a trap pan or arm 38 for dumping the beam into the aforesaid pocket and another arm 39 for imprisoning the beam after it has been dumped, the former of said arms being capable of swinging downward through aperture 56. A hub boss 59 is aligned axially with and between stationary spaced pivot bearings 60 on bracket 42 and accommodates a pivot pin 61 therethrough. Figs. 8, 9 and 10 show particular features of the hinge construction incorporating hinge pin 61 and hinge spring 62. The latter is loosely coiled about the former and has an out-turned straight end made fast in the head of pin 61 by brazing or otherwise so that this end of the spring remains rotatively fixed with the hinge pin. The hinge pin itself is held from rotating in one of the bearings 60 by the engagement of a wing key 66 occupying a diametrical slot through pin 61 and projecting into axially sliding engagement with diametrically opposite internal key ways 67 cut through the entire axial length of the cylindrical wall of bearing 60, which wall elsewhere around its circumference provides a snug sliding fit for pin 61. Hub 59 and the stationary bearing 60' are bored to a size accommodating the free coiling and uncoiling action of spring 62 so that the latter exerts rotary tension on bell crank 59 serving yieldably to maintain the latter in its position shown in Figs. 2 and 5. This rotary tension is exerted as best shown in Fig. 9 by means of the inside end of spring 62 engaging the offset end of a split washer 46 that is fixed to hub 59 inside the bore thereof by brazing, welding or other suitable means. Pin 61 and spring 62 are together removable from the hinge bearings by first removing cotter pin 63 then pushing the pin lengthwise toward the left in Fig. 8, as is permitted by the open coiling of the spring, until wing key 66 is clear of the keyways 67 and then removing the key, after which the pin and spring are free to be withdrawn from the bearings 60 and 60' toward the right in Fig. 8. Such disassembly need be resorted to only for cleaning and lubricating, or replacing damaged parts.

The operation of my improved safety trap will be described with respect to a single end of a single brake beam but in the understanding that each end of each brake beam equipped with such trap will similarly operate. Under normal service conditions the safety trap plays no part in the brake applying and brake releasing action of conventional brake gear which may include a conventional brake beam such as 24. The channel member 25 of the brake beam is normally supported by swingable hangers 20 so as to ride above and clear of dumping arm 38 of the bell crank 58, while tension rod 26 of the beam normally rides above and clear of the shelf iron extension 33 of the trap frame as shown in Figs. 2 and 5. Said channel member and tension rod straddle the riser 47 of the yoke of the trap frame. Under these conditions there is ample clearance for beam member 25 in the space bounded by mounting bar 31, bell crank 58 and slanting frame brace 43, to permit the brake beam to swing right and left on its supporting hangers 20 to and from brake applying position wherein brake shoes 29 are thrust against the car wheels 11.

To cause such braking, the piston of the usual air brake cylinder (not herein shown) pulls toward the right on draft rod 55 in Fig. 1 which swings lever 30 about its pivotal anchorage at 23 whereby lever 30 forces brake beam 24 toward the right in Figs. 1, 2 and 3. Should this occur in the absence of my improved safety trap when one of the hangers 20 has fallen or is "down" owing, for instance, to shearing off of its support stud 21, the brake shoe at that end of the beam will be thrust forcibly against the turning car wheel at a time when the beam is without constraining control as to up and down movement. Consequently drag of the revolving wheel upon the brake shoe will throw the brake beam up if the wheel is turning clockwise in Fig. 3, or will pull the brake beam down if the wheel is turning counterclockwise. In the former case breakage of parts may occur resulting in some part coming loose, falling to the rail and causing derailment of the car. In the latter case the head or shoe of the brake beam is most likely to be dragged beneath the car wheel and track with equal probability of disaster.

When my safety trap is present the beam member 25, in accidentally falling from its position in Fig. 2, drops first onto bell crank arm 38 which latter swings counterclockwise responsively to the weight of the beam which easily overcomes the tension in hinge spring 62. This yieldable swinging of the bell crank enables arm 38 to dump the beam member 25 into the downward tapering pocket formed by shelf iron 32, side wings 34 and the arm 38 itself supported and backed up by the hinge bracket 42, 44. The latter comprises a barrier restricting movement of the brake beam toward the right, when the air cylinder pulls on draft rod 55, sufficiently to prevent brake shoe 29 from being thrust into contact with the wheel. Also the face of bell crank arm 38 which is directed toward the left in Fig. 3 forms a deflecting and guiding abutment inclined relative to the vertical downward and away from the truck wheel 11. This affords a barrier shaped and arranged automatically to deflect the brake beam in a direction away from the car wheel when this barrier is engaged by the beam during accidental dropping of the latter from its normal working level shown in Fig. 2.

The other arm 39 of the bell crank has now swung to a position overlying beam member 25. Arm 39 encounters the leaf spring latch 36 after dumping of the beam member into the trap pocket and may not continue its full movement to a position of interlock with such latch shown in Fig. 3 as a result merely of arm 38 dumping the beam member into the trap pocket. But whenever pull of the air brake cylinder is imparted to the beam for applying the brake, this additional force exerted by beam member 25 toward the right on bell crank arm 38 will complete the swinging movement of the imprisoning arm 39 to its latch locked position shown in Fig. 3. In this condition the beam member 25 is imprisoned against lifting movement as well as against movement toward the car wheel. It is optional, and a matter of operative relationship between leaf spring 36 and imprisoning arm 39, whether the latter shall or shall not require force of the braking pull of the air cylinder to effect latching of arm 39 by leaf spring 36. The latter might be made to flex so readily that the mere swinging momentum of the bell crank would cause the end of arm 39 to pass and become locked by the end of leaf spring 36, or by whatever other form of latch might be employed. When member 25 is imprisoned in the trap pocket the tension rod 26 will be prevented from falling below a corresponding level by shelf iron extension 33.

When a fallen or "down" brake beam is thus dependably caught and held in noninterfering relation to the wheels of the truck it may be released by merely thrusting latch spring 36 to the left in Fig. 3 and lifting beam member 25 out of the trap pocket. Hinge spring 62 will automatically reset the bell crank to its position in Fig. 2. If the beam must be removed from the truck for repairs, the frame yoke 41, 43, 47 is readily removed as shown in Fig. 6 by taking out cotter pins 50, 52 and 54. In neither case does the presence of the safety trap occasion any delay or loss of time in servicing, nor are any special tools required to open and recondition the trap in connection with brake beam repair.

Aside from the more serious consequences of train wreck, this safety trap will save much time now lost in train stoppage that is frequently occasioned by the need of inspecting brakes on a run whenever the sparking of brake parts against the car wheels indicates disabled brake gear. It is a help to the keeping of train schedules, a dependable preventative of serious railroad accidents, and a simple trouble-proof attachment of sufficient simplicity and low cost to be in keeping with conventional equipment gear of standard rolling stock.

The shapes, sizes and ways of mounting a safety trap embodying these principles of construction and operation may be varied at will to suit different kinds and relationships of car trucks and brake beams. The claims to protection of invention made herein are not limited to the particular parts and arrangements herein shown and described but apply to and are intended to cover all substitutes and equivalents that are fairly comprehended by the language of the claims.

I claim:

1. In a railway car truck, the combination with a wheeled truck frame of, a bolster resiliently carried by said frame, a brake beam swingably suspended from said frame to move forward and backward at a service level in relation to the wheels of said truck respectively to apply and release the brake, a support structure mounted on said bolster extending to a position underlying said brake beam below said service level, and a barrier mounted and arranged on said structure in a manner to restrict said forward movement of said beam only when the latter is lower than said service level.

2. A safety trap for catching and then holding away from the truck wheel of a railway car a down brake beam when accidentally dropped to a down level lower than the brake applying level in which said beam normally reciprocates toward and away from the car wheel, embodying a rigid support structure fixedly mountable on the car truck in a location to extend at said down level to a position underlying the brake beam, said structure including a protective barrier located to upstand at the car wheel side of the brake beam wholly below said working level in a position to restrain the brake beam from movement toward the car wheel only when the beam is dropped to said down level.

3. A safety trap for deflecting and then holding away from the truck wheel of a railway car a down brake beam when accidentally dropped to a down level lower than the brake applying level in which said beam normally reciprocates toward and away from the car wheel, embodying a rigid support structure fixedly mountable on the car truck in a location to extend at said down level to a position underlying the brake beam, said structure including a protective barrier located to upstand at the car wheel side of the brake beam wholly below said working level in a position to restrain the brake beam from movement toward the car wheel only when the beam is dropped to said down level, said barrier further being shaped and arranged to be engaged by and to deflect the brake beam in a direction away from the car wheel during dropping movement of said beam to said down level.

4. A safety trap as defined in claim 2, in which the said barrier presents for sliding engagement by the said dropping brake beam a beam deflecting guide face inclined with respect to the vertical downward and away from the said truck wheel.

5. In a railway car truck, the combination defined in claim 14, together with a brake beam deflector embodying a structure located at the inside junction of the said shelf section and the said riser section shaped and disposed to present a beam deflecting guide face slidably engageable by a dropping brake beam and inclined with respect to the vertical downward and away from the said truck wheel of the car, thereby to deflect the brake beam in a direction away from the car wheel upon accidental dropping of the beam below its said normal working level.

6. A safety trap for catching and holding a fallen brake beam in brake retracting relation to the truck wheels of a railway car, comprising in combination, a pocket-forming rigid support structure adapted to be carried by the truck of a railway car beneath the normal riding position of said brake beam, and a beam imprisoning device shiftable to and from a relationship to said structure wherein said device is operative to detain a fallen brake beam within the pocket of said structure.

7. A safety trap for catching and holding a fallen brake beam in brake retracting relation to the truck wheels of a railway car, comprising in combination, a pocket-forming rigid support structure adapted to be carried by the truck of a railway car beneath the normal riding position of said brake beam, and a yieldably positioned device constructed and arranged to be shiftable responsively to the weight of a fallen brake beam to and from a relationship to said structure wherein said device imprisons a fallen brake beam within the pocket of said structure.

8. A safety trap for catching and holding a fallen brake beam in brake retracting relation to the truck wheels of a railway car, comprising in combination, a pocket-forming rigid support structure adapted to be carried by the truck of a railway car beneath the normal riding position of said brake beam, a yieldably positioned device constructed and arranged to be shiftable responsively to the weight of a fallen brake beam to and from a relationship to said structure wherein said device overlies a fallen brake beam within the pocket of said structure, and latching means automatically operative to catch and hold said device positively in said relationship.

9. A safety trap for catching and holding a fallen brake beam in noninterfering relation to the truck wheels of a railway car, comprising in combination, a rigid support structure forming a downward tapering pocket and adapted to be carried by the truck of a railway car beneath the normal riding position of said brake beam, and a spring positioned dump arm pivotally mounted on said structure to swing to and from a relationship to the latter enabling said arm to receive a fallen brake beam and dump said beam downward into said tapering pocket.

10. A safety trap for catching and holding a fallen brake beam in brake retracting relation to the truck wheels of a railway car, comprising in combination, a pocket-forming rigid support structure adapted to be carried by the truck of a railway car beneath the normal riding position of said brake beam, and a beam imprisoning bell crank device pivotally mounted on said structure to swing to and from a relationship thereto enabling said device to straddle and detain a fallen brake beam within the pocket of said structure.

11. A safety trap for catching and holding a fallen brake beam in brake retracting relation to the truck wheels of a railway car, comprising in combination, a pocket-forming rigid support structure adapted to be carried by the truck of a railway car beneath the normal riding position of said brake beam, and a spring positioned bell crank pivotally mounted on said structure having a dump arm swingable responsive to the weight of a fallen brake beam and a beam imprisoning arm swingable to and from a relationship to said structure wherein said imprisoning arm detains a fallen brake beam within the pocket of said structure.

12. A safety trap for catching and holding a down brake beam in brake retracted relation to the truck wheels of a railway car, comprising in combination, a rigid support structure adapted to be carried by the truck of a railway car forming a pocket beneath the normal service position of a brake beam, a yieldably positioned device constructed and arranged to be shiftable to and from a relationship to said structure wherein said device overlies a down brake beam within said pocket, latching means automatically operative to interlock with said device in said relationship, and an actuator for said device mounted and arranged to be moved in one direction responsively to the weight of a down brake beam and to be moved in another direction responsively to brake applying movement of said down brake beam thereby to effect interlocking between said latching means and said device to prevent said down brake beam from rising out of said pocket.

13. A down brake beam safety trap for preventing train wrecks caused by interference of disabled brake gear with the truck wheels of a railway car, comprising in combination, a support structure adapted to be carried by the car truck beneath the normal service position of a brake beam of said gear, and a barrier mounted and arranged on said structure in a manner to permit the latter to receive and support the weight of a down brake beam, said barrier being movable to a position overlying said down brake beam in a manner to prevent the latter from being lifted to its said normal service position when the brake is applied.

14. In a railway car truck, the combination with a wheeled truck frame of, a bolster resiliently carried by said frame, a brake beam swingably suspended from said frame at a normal working level comprising a trussed skeleton structure including a compression member and a tension member diverging therefrom, a support structure mounted on said bolster including a shelf section underlying both said compression and tension members and a riser section upstanding between said compression and tension members of the brake beam coupled fixedly to said bolster above the brake beam and coupled fixedly to said shelf section to brace and help support the latter.

15. A safety trap as defined in claim 10, together with a frame yoke roofing over the said bell crank device and removably connected to the said support structure in a manner to reinforce and brace the latter.

16. A safety trap as defined in claim 10, in which the said support structure includes an upright mounting bar, together with a frame yoke including in conjoined fixed relationship a riser section having its lower end removably coupled to the said support structure, a roof section having one end removably coupled to the said mounting bar, and a slanting brace section having one end removably coupled to said mounting bar.

17. A down brake beam safety trap including an angle frame having a vertical mounting section and a horizontal shelf section for supporting a down beam, a hinge bracket upstanding from said shelf section spaced from said mounting section to form therebetween a pocket for restraining said down beam, a bell crank pivotally supported by said bracket having a dump arm swingable up and down in said pocket and further having a barrier arm swingable to and from a position bridging the open top of said pocket, and a latch carried on said mounting section in position to act retentively on said barrier arm.

18. A down brake beam safety trap as defined in claim 17, together with a hinge joint pivotally coupling the said bell crank to the said hinge bracket including a rotary bearing on said bell crank, a rotary bearing on said bracket, a single hinge pin occupying both of said bearings, and a hinge spring loosely coiled inside said bearings around said hinge pin.

19. A down brake beam safety trap as defined in claim 17, together with a hinge bearing on the said hinge bracket, a hollow hinge hub on the said bell crank, a spring coil occupying said hub and said bearing, a hinge pin extending through said spring coil fixed to one end of the latter, and an abutment fixed in said hub impellingly engaged with the other end of said spring coil.

20. A down brake beam safety trap as defined in claim 17, together with spaced hinge bearings on the said hinge bracket, a hollow hinge hub on the said bell crank between said bearings, a spring coil occupying said hub and one of said bearings having one end impellingly related to said hub, a hinge pin extending through said spring coil and both of said bearings, and means releasably to fasten said removable pin against rotary movement relative to the other of said bearings.

CHARLES C. RICH.